H. W. KARDELL.
TRACTION PLOW.
APPLICATION FILED MAR. 12, 1917.
1,270,525.
Patented June 25, 1918.
3 SHEETS—SHEET 1.
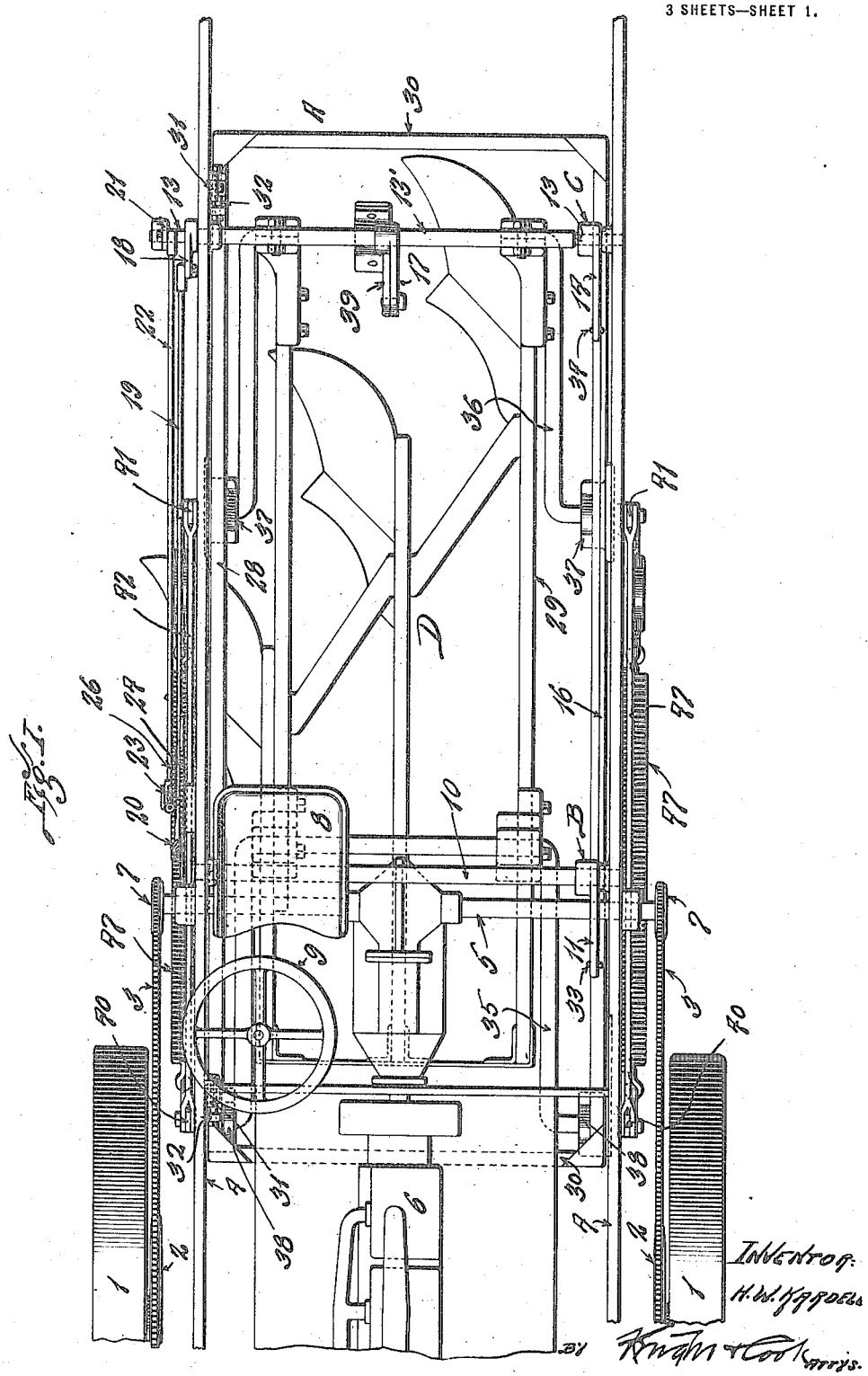

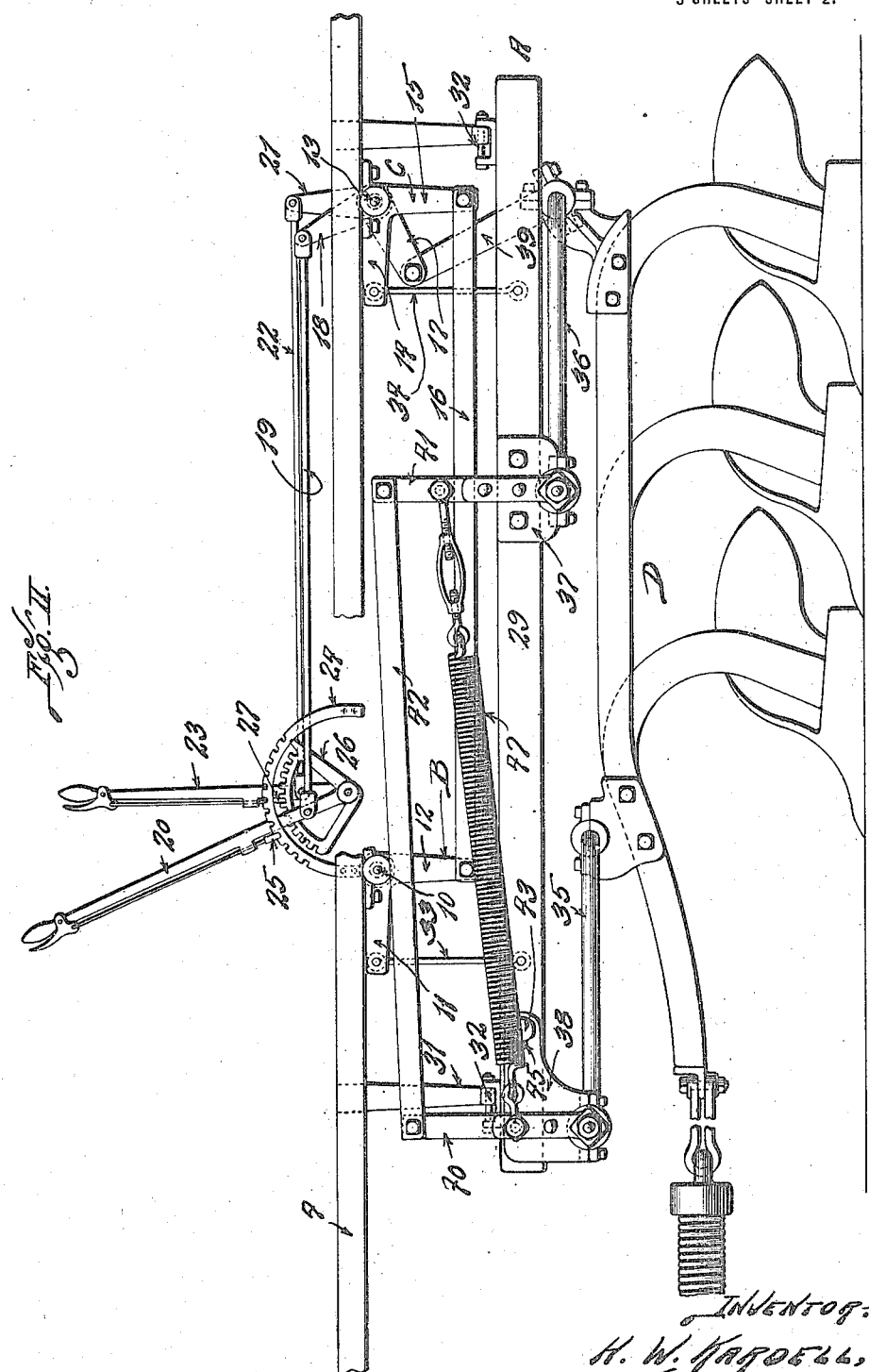

H. W. KARDELL.
TRACTION PLOW.
APPLICATION FILED MAR. 12, 1917.
1,270,525.
Patented June 25, 1918.
3 SHEETS—SHEET 3.
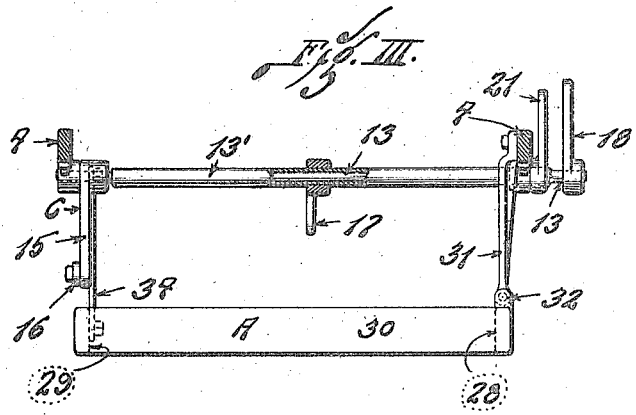
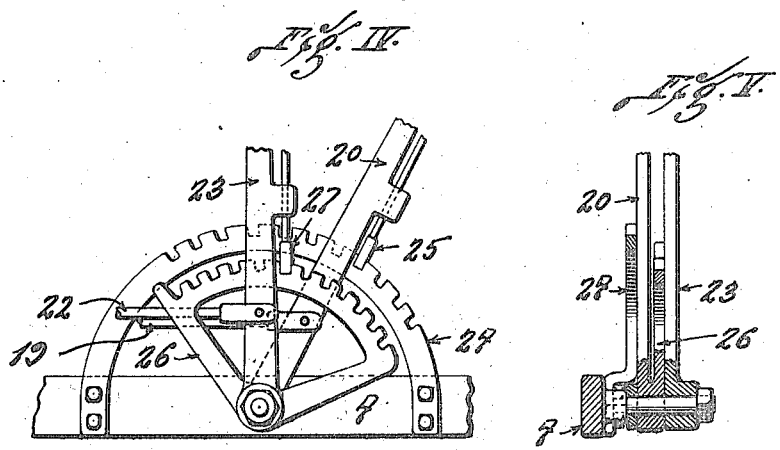
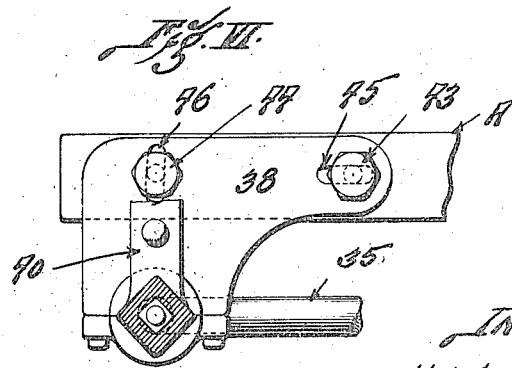

UNITED STATES PATENT OFFICE.

HENRY W. KARDELL, OF ST. LOUIS, MISSOURI, ASSIGNOR TO KARDELL TRACTOR & TRUCK COMPANY, A CORPORATION OF DELAWARE.

TRACTION-PLOW.

1,270,525.  Specification of Letters Patent.  Patented June 25, 1918.

Application filed March 12, 1917. Serial No. 154,229.

*To all whom it may concern:*

Be it known that I, HENRY W. KARDELL, a citizen of the United States of America, a resident of the city of St. Louis, State of Missouri, have invented certain new and useful Improvements in Traction-Plows, of which the following is a full, clear, and exact description, reference being had to the accompanying drawings, forming a part of this specification.

My invention relates to a traction plow, the present improvements pertaining to means whereby the plows proper of a traction plow may be so held as to maintain the front and rear ends of the plow proper absolutely in the positions to which they may be adjusted, and provide for any desired suction without liability of deviation therefrom while the plow proper is in use. The invention also pertains to a very efficient supporting means for balancing the weight of the plow proper, in order that it may be easily raised and lowered.

Figure I is a top plan view of my traction plow, the forward portion of the tractor being omitted.

Fig. II is a side elevation of the plow frame, the plow proper and portions of the tractor frame by which the plow frame and plow proper are carried.

Fig. III is a cross section through the tractor frame at a point back of the plow frame, showing the plow frame and the rear plow frame operating members in elevation, one of the shafts of the operating means being shown in longitudinal section.

Fig. IV is an enlarged side elevation of portions of the hand levers and the quadrants by which these levers are held.

Fig. V is a section taken through the quadrants.

Fig. VI is an enlarged view of the adjusting device in which one of the arms of the forward plow carrying stirrup is mounted.

The tractor of my traction plow comprises traction wheels 1 fitted to a suitable axle (not shown) and provided with sprocket wheels 2 which receive drive chains 3.

The frame of the tractor includes longitudinal side bars 4 and suitable transverse members, and may, for example, be in general of the construction shown in U. S. Patent No. 1,153,692, issued to me September 14, 1915. The rear end of said tractor frame may be supported by a steering wheel as contemplated in said patent.

The tractor frame serves to support a jack shaft 5 operable by a motor 6 and provided with sprocket wheels 7 to which the drive chains 3 are fitted, thereby providing for the transmission of power from said motor to the traction wheels 1.

A driver's seat 8 is suitably mounted on the tractor frame in proximity to the hand wheel 9 of a steering shaft connected in any preferred manner with the steering wheel by which the direction of travel of the tractor is governed.

The tractor frame, including the longitudinal side bars 4, constitutes a carrier for a plow frame and plows connected to said plow frame of which full description will be hereinafter given. For convenience of description, I will first set forth certain parts carried by the tractor frame utilized in the adjustment of the plow frame and the plows.

10 designates a forward transverse rock shaft supported by the tractor frame side bars and having fixed thereto a bell-crank B (see Figs. I and II) comprising lever arms 11 and 12 which, respectively, extend forwardly and downwardly from the hub of the bell-crank. 13 is a rear transverse rock shaft supported by the tractor frame side bars, this rock shaft having fixed to it a bell-crank C comprising lever arms 14 and 15 extending, respectively, forwardly and downwardly from the hub of said bell-crank C. 16 is a connecting rod joining the downwardly extending lever arms 12 and 15 of the bell-cranks B and C.

13' designates a tubular rear rock shaft surrounding the rear rock shaft 13, said shaft 13' having fixed to it a centrally located lever arm 17.

Means for rotating the rear rock shaft 13 includes a lever arm 18, secured to said shaft, adjacent one of its ends, and an operating rod 19 pivoted to said lever arm and leading therefrom to a hand lever 20 pivoted to one of the tractor frame side bars so as to be within convenient reach of the driver riding on the seat 8.

The tubular rear rock shaft 13' has fixed to it, adjacent the lever arm 18, a lever 21 having an operating rod 22 pivoted thereto, the said rod leading to a hand lever 23. This hand lever is pivotally mounted on the same center as the hand lever 20.

24 designates a toothed quadrant secured to one of the tractor frame side bars alongside of the hand lever 20 and adapted to receive a latch bolt 25 carried by said lever.

The hand lever 20 has fixed thereto a toothed quadrant 26 movable with said lever and adapted to be engaged by a latch bolt 27 carried by the hand lever 23. This arrangement makes it possible to move the hand lever 23 when the hand lever 20 is shifted and also provides for the hand lever 23 being moved independently of the hand lever 20, thereby permitting simultaneous rotative movement of the two shafts 13 and 13' or rotation of the shaft 13' without rotating the shaft 13.

The plow frame, indicated by A, is composed of side bars 28 and 29 and end bars 30. This frame is suspended from the tractor frame by hangers 31 secured to one of the side bars 4 of the tractor frame and connected to the side bar of the plow frame by hinges 32 so constructed as to permit longitudinal, or backward and forward, movement of the plow frame relative to the tractor frame. The plow frame A is also suspended by hanger rods 33 and 34 having their upper ends pivoted, respectively, to the forwardly extending arms 11 and 14 of the bell-cranks B and C and their lower ends pivoted to the side bar 29 of the plow frame. It will be readily understood that, by the construction just described, the side of the plow frame at which the side bar is located may be raised and lowered while the opposite side of the plow frame swings on the hinges 32. The side of the plow frame which is raised and lowered faces the land sides of the plow proper and the raising and lowering of the frame takes place when the hand lever 20 is thrown rearwardly and forwardly to operate the rear rock shaft 13 through the medium of the rod 19 and the lever arm 18. The movement of said rock shaft is partaken of by the bell-crank C and communicated through the connecting rod 16, to the bell-crank B, and said bell-cranks B and C operate the hanger rods 33 and 34 supporting the side of the plow frame occupied by the side bar 29.

In using the term plow proper herein I designate by such term a complete ground breaking implement composed of a beam and a mold-board having a share, doing this for the sake of simplicity of description. The plow proper may be either a single implement or a gang of such implements as shown in the drawings.

The plow proper, indicated as a whole by the letter D, is pivotally suspended from the plow frame A by forward and rear U-shaped stirrups 35 and 36, the arms of the rear stirrup being bent outwardly at their ends and journaled in boxes 37 fixed to the plow frame side bars. The arms of the forward stirrups 35 are bent outwardly at their ends and journaled in adjustable boxes 38 attached to the plow frame side bars in a manner to be hereinafter described.

The cross member of the rear stirrup 36 has loosely secured to it an arm 39 which is pivoted to the lever arm 17 carried by the rear rock shaft 13'. Inasmuch as the hand lever 23 is connected to said rock shaft by the operating rod 22 and the lever arm 21, it will be understood that movement of said hand lever in one direction will result in raising the plow proper, and movement of said hand lever in the opposite direction will result in lowering such plow proper. The quadrant 26 being connected to the hand lever 20, and the hand lever 23 being movable independently of the hand lever 20, the plow frame A and the plow proper D may be raised or lowered simultaneously when the hand lever 23 is locked to the quadrant 26, or only the plow proper raised and lowered without disturbing the plow frame.

40 and 41 designate lever arms fixed respectively to the journal members of the stirrups 35 and 36 at each side of my traction plow, these arms being so positioned relative to the arms of said stirrups that they, with the stirrup arms, constitute bell cranks by which the central portions of the stirrups may be raised and lowered. The lever arms 40 and 41 are united by connecting rods 42 through the medium of which any movement imparted to one of said lever arms will be also imparted to the other lever arm. Consequently, when the plow proper D is raised or lowered by the operation of the rock shaft 13' and the elements associated therewith, including the arm 39 fitted to the stirrup 36, said stirrup will be swung in an arc of a circle, the lever arms 41 fixed thereto will be swung in an arc of a circle, and through the medium of the connecting rods 42, motion will be transmitted to the forward stirrup 35 to swing it to substantially the same degree as the rear stirrup is swung. This arrangement provides for the plow proper being always maintained substantially parallel with the plow frame A and makes it possible to lower the plow proper to any desired degree without altering the suction of the plow.

To provide for change of degree of suction of the plow proper, I secure the journal receiving members 38 to the plow frame A so that it may be raised and lowered to alter the elevation of the forward stirrup 35. The rear ends of these members 38 are attached to the plow frame by pivot bolts 43, and the forward portions of said members are attached to said frame by set bolts 44. These bolts 43 and 44 extend through slots 45 and 46 which, respectively, permit longitudinal movement and vertical adjustment of the journal receiving members 38, so that said members may be raised and lowered and again secured firmly to the plow frame with the pivotal centers, or axes, of the stirrups 35 and 36 the same distance apart as they were before the adjustment of the members 38. This adjustment to vary the suction of the plow therefore does not change the uniformity of action of the stirrups in lifting and lowering the plow proper.

47 designates counterbalance springs interposed between and connected to the lever arms 40 and 41. These springs are attached to the rear lever arms 41 farther from the axis of the stirrup 36 than the points of attachment to the lever arms 40 relative to the axis of the front stirrup 35. Consequently said springs are capable of exerting greater pull upon the rear stirrup than upon the forward stirrup, and assist in the raising of the plow proper when the latter is to be elevated from the ground, so that the operator may, with slight exertion, lift the plow proper when operating the hand lever 20.

I claim:—

1. A traction plow comprising a supporting frame, a plow proper, a pair of stirrups by which said plow proper is suspended from said frame for vertical movement relative thereto, the axis of one of said stirrups being adjustable vertically relative to the axis of the other stirrup.

2. A traction plow comprising a supporting frame, a plow proper, a pair of stirrups pivoted to said plow proper, and pairs of journal boxes carried by said supporting frame in which the arms of said stirrups are journaled, one pair of said journal boxes being adjustable vertically.

3. A traction plow comprising a supporting frame, a plow proper, a pair of stirrups pivoted to said plow proper, and pairs of journal boxes carried by said supporting frame in which the arms of said stirrups are journaled, one pair of said journal boxes being adjustable vertically and horizontally to alter the elevation of the axis of one of the stirrups without changing the distance between the pivotal centers of the two stirrups.

4. A traction plow comprising a supporting frame, a plow proper, a pair of stirrups pivoted to said plow proper and having their arms journaled to said frame, lever arms secured to the arms of said stirrups, connecting rods uniting said lever arms, and counterbalance springs secured at their ends to said lever arms, said springs being attached to the rearmost of said lever arms at greater distances from the axes of the rear stirrups than they are to the forward lever arms relative to the axes of the forward stirrups.

5. In a traction plow, a main frame, a plow frame suspended from said main frame movable vertically relative thereto, a plow proper suspended from said plow frame and movable vertically relative thereto, an operating lever having connection with said plow frame, a quadrant movable with said operating lever, and a second operating lever having connection with said plow proper, said last named operating lever being provided with means for engaging said quadrant.

In testimony that I claim the foregoing I hereunto affix my signature.

HENRY W. KARDELL.

Copies of this patent may be obtained for five cents each, by addressing the "Commissioner of Patents, Washington, D. C."